Patented Dec. 29, 1936

2,066,263

UNITED STATES PATENT OFFICE 2,066,263

SOYBEAN COMPOUND FOR AGING GRAIN DISTILLATE

John T. Finley, Chicago, Ill., assignor to Archer-Daniels-Midland Company, a corporation of Delaware No Drawing. Application December 21, 1933, Serial No. 703,411

2 Claims. (Cl. 99—48)

The present invention relates to the production of a dehydrated pure food compound, to be used in whiskey, grain distillate, rum or brandy as an aging compound, and has particular reference to an improved type of compound comprising soy bean products and method of making the same.

A particular object of this invention is the production of an improved compound containing dried soy bean constituents not altogether soluble in strong-proof alcoholic solutions but having the qualities of aging the same when mixed therewith.

An additional object is the production of a compound of pure food character containing the essential qualities derived from soy bean meal or flakes that will act upon immature, diluted or strong alcoholic solutions and remove therefrom the new, raw, sharp, biting, ethanol taste and peculiar odor and imparting thereto a smooth, pleasant taste and aged-like character, by the act of depriving the alcohol solution of those objectionable characters that are otherwise overcome by keeping the same in charred wood containers for periods of time.

A further object in this invention is to produce a compound, comprising all of the qualities of a pure food which compound within itself is composed principally of constituents derived from soy beans or the products thereof and that may be soluble in water solutions and insoluble when strong alcohol is added thereto, a compound composed of the products of soy beans containing in part a major portion of the vegetable protein chiefly the protein of soy bean flakes or meal, either crude and only slightly soluble in water over which or through which hot alcohol may be poured or hot alcoholic solutions may be run, or which may be steeped in new-made alcoholic beverages and separated therefrom by the acts of rectifying or filtration, or a combination of soluble soy bean derivatives, and partially soluble soy bean meal or flakes, either or both combined with the products of germinated cereal or cereals in combination together that may act as a filter mass against the inflow of either hot or cold strong or weak solutions of ethyl alcohol for the purpose of improving the taste of alcohol produced by the processes known to the arts.

Furthermore, it is sometimes desired to manufacture an alcohol by the action of a yeast in a solution of sugars formed by treating cellulose or carbohydrate material and acid under pressure in closed converters and most generally the alcohol yield is relatively low compared to the amount of converted raw material used, which instance I have found due to the absence of a well balanced fermentable media, and a part of this invention resides in those steps of adding to said cellulose or carbohydrate materials and acid 10% more or less of soy bean meal or flakes, or adding same to any combination of cellulose and carbohydrate material and acid, prior to the time of the conversion of said material as outlined in this paragraph, distinctly for the purpose of intermingling the soy bean constituents with any resulting sugars, thereby greatly activating the yeast in their processes of fermentation by these nutritional values, thus imparted to the fermenting solution and in this way resulting in a greater alcohol yield at a considerable saving of time and cost.

It has been my discovery that when alcohol or strong alcoholic solutions are brought in contact with a substance of a high protein and organic mineral character, and these permitted to lager therewith during a short course of time, the raw taste and ethanol odor of new alcohol distillates will be removed and a smooth taste of somewhat aged character imparted thereto, whether the protein substance and organic mineral crude or refined continues to remain in the alcoholic solutions or is removed therefrom or separated from same and the method by which soy bean meal or flakes is to be used under this invention in the treatment of alcohols for the purpose of rendering them more acceptable for blending with older whiskies or cutting with water and combining therein odors of botanical drugs such as in the making of gin or in improving the taste of brandies or rum, these and other features of the process will be apparent from a consideration of the following matter, to wit:

In one embodiment of my invention to which it will be recognized, I am not limited, 4 pounds of soy bean meal or flakes is mixed with 4 ounces of green rye malt to which is added 16 pounds of water. This then is stirred and heated slowly to a temperature of 212° F. and held thereat for a space of 30 minutes, to which is then added an additional 12 pounds of water and 2 pounds of green rye malt and 2 pounds of low diastatic high kiln-dried rye malt and the temperature of the mixture whilst stirring is regulated and held at 100° F. and slowly brought to 154° F. and held there for the period of 1 hour. The liquor is then separated from the husks of the cereals and run into a condenser or vacuum pan, usually found in malt syrup plants or milk evaporating plants where a part of the water is removed after which the heavy liquor containing the dissolved solids of the raw materials used in the water batch is conducted to the spray nozzles of a milk-drying apparatus where practically all of the remaining moisture is removed. The dry solids being recovered and steeped in hot alcohol in the proportions of 1 pound of said solids to each gallon of alcohol or grain distillate. It being permissible to substitute all of the rye malt for corn malt of the same amounts and character as to its low-dried and high-dried condition. In the first instance the alcoholic solutions are rendered more adaptable for the manufacture of blended rye whiskey and in the second instance the treated alcohol will be found more desirable in the blending of bourbon whiskey.

An ideal way to use the solids of the product thus produced under the process mentioned in the first part of the foregoing paragraph, is to take an alcohol such as a grain distillate that is considered to be a high proof grain alcohol and an equal quantity of pure water, dissolving first 2 pounds of the solids produced under this process to each gallon of the water using first a little water with said solids and gradually adding the balance of water until solids are fully dissolved, heating then this liquid to the boiling point and removing from the heat and instantly adding the measured quantity of high proof spirits having the same in a stoppered container allowing the alcohol solution to cool and the original dissolved solids settle out, filtering then the alcohol solution or preferably more completely separate the alcohol solution from the solids by rectifying the same. To the alcohol solution thus recovered a small quantity of pure bourbon or pure rye whiskey may be added according to the variety of the malt used in the process, but in an amount much less than ordinarily would be added entirely in the absence of this process, therefore it is obvious that the finer grades of whiskies now available for blending purposes may be held in more reserve by following the lines of this improvement as applied to the distillery industry, but still use an amount of the more expensive pure whiskies in the blending that would comply with the Pure Food and Drug Act in reference to the manufacture of whiskey compounds, and in this way produce the product more economically than otherwise attained.

In the manufacture of grain distillate it is ofttimes found that fermentation no matter how well regulated is retarded because of the absence of desirable yeast food in the form of nitrogenous materials, organic minerals, or quickly fermentable carbohydrates, and it will be observed that by adding 1 pound of the solids material produced by this process to each 5 gallons of distillers' fermenting liquids that a higher yield of grain distillate will be obtained in a shorter period of time, and likewise where the dry material produced by the methods thus disclosed is added in similar less or more proportions to the yeast liquids under considerations of fermentation or fermenting in yeast vats in yeast industries a greater yield of more healthy yeast cells will be produced, thereby enhancing the value of the resulting yeast.

Still another way that this invention will find use in the alcohol industries is in the manufacture of a better quality of gin in that a quantity of soy bean meal or flakes is mixed with botanical drugs in desired amounts comprising:

Soy bean flakes
Angelica root
Coriander seed
Cassia bark
Orris root
Sweet orange peel
Sloe berries (for making sloe gin)
Juniper berries (the predominating note)

Over this mixture of dry materials and through the same hot diluted grain distillate is run, thence to a rectifier, thence to the bottling machinery. Or the combination of soy bean flakes and the botanical herbs may be boiled in a dilute grain distillate in a false bottom pot-still, so constructed that the condensed spirits is permitted to continuously run back into said pot-still until such time that it is desirable to completely remove from the still the pure gin by allowing the same to condense out into a suitable container from which it may be at once bottled for immediate use.

What I claim is:

1. The method of aging spirits to improve the flavor of the same which comprises dissolving soy bean solids in water with malt, separating undissolved ingredients and combining the dissolved ingredients in a mixture comprising alcohol and water.

2. The method of aging spirits to improve the same which comprises treating a mixture comprising alcohol and water with dried water soluble soy bean constituents.

JOHN T. FINLEY.